March 4, 1958     F. F. KOBLITZ ET AL     2,825,672
IMPROVED PLASTIC LAMINATE
Filed Feb. 28, 1955
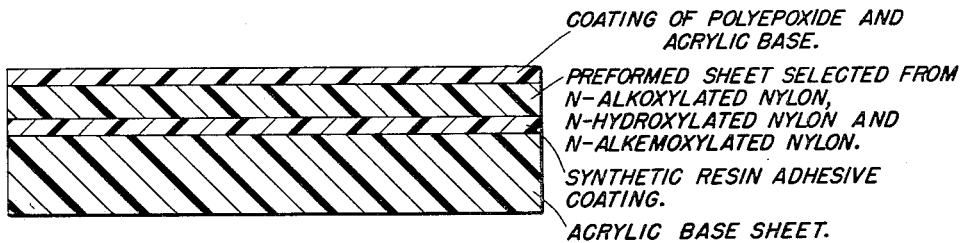
COATING OF POLYEPOXIDE AND ACRYLIC BASE.
PREFORMED SHEET SELECTED FROM N-ALKOXYLATED NYLON, N-HYDROXYLATED NYLON AND N-ALKEMOXYLATED NYLON.
SYNTHETIC RESIN ADHESIVE COATING.
ACRYLIC BASE SHEET.
INVENTORS
FRANK F. KOBLITZ
JOAN TINOCO
BY
attorney

2,825,672
IMPROVED PLASTIC LAMINATE

Frank F. Koblitz, Oregon, Wis., and Joan Tinoco, West Haven, Conn., assignors to Bjorksten Research Laboratories, Inc., Madison, Wis., a corporation of Illinois Application February 28, 1955, Serial No. 491,214

5 Claims. (Cl. 154—43)

This invention relates to a method for improving the characteristics of plastic sheets and more particularly, for increasing the wearing qualities of sheets comprising primarily polymethyl methacrylate by providing a nylon layer thereover and a protective coating over the nylon layer.

Heretofore, one of the major problems in the use of polymethyl methacrylate polymers has been their characteristically relatively poor resistance to abrasion and scratching. It is well known that articles manufactured from these polymers become easily marred through ordinary handling and subjection to particles of dust and the like. In addition, the optical qualities of the polymer are decreased by organic solvent action. The attempts to improve the quality of these polymers by such methods as heating have not been exceptionally successful. By laminating a springy and transparent layer of nylon to the polymethyl methacrylate sheeting, the plastic not only retains its transparency, but also becomes scratch and abrasion resistant; it becomes craze resistant to some solvents which attack the methyl methacrylate polymers.

It is an object of this invention to provide an improved plastic laminate.

Another object is to provide a laminate having a higher scratch resistance than uncoated polymethyl methacrylate containing polymers.

Another object is to provide a laminate having a higher abrasion resistance than uncoated polymethyl methacrylate containing polymers.

Another object is to provide a plastic laminate which after having been elongated has much better craze, shatter, scratch and abrasion resistance than uncoated polymethyl methacrylate polymers.

Further objects will become apparent as the following detailed description proceeds.

The figure illustrates the invention as claimed.

In accordance with one embodiment of the invention, a thermoplastic adhesive, preferably an epoxy resin mixture, is sprayed on a polymethyl methacrylate sheet of suitable dimensions. After the adhesive is allowed to air-dry, a nylon sheet is laminated to the polymethyl methacrylate sheet. The nylon-polymethyl methacrylate laminate is allowed to cool to room temperature, and thereupon a coating of methacrylic acid-epoxy resin mixture is sprayed upon the polyamide layer. Curing of the epoxy resin mixture then proceeds.

The polyepoxides used in the preparation of the novel products of the invention comprise all those organic compounds containing at least two reactive epoxy

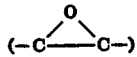

groups in their molecule. The polyepoxides may be saturated or unsaturated, aliphatic, cycloaliphatic, aromatic or heterocyclic and may be substituted if desired with non-interfering substituents. The polyepoxides may be monomeric or polymeric.

For clarity, many of the polyepoxides will be referred to hereinafter in terms of their epoxy equivalency. The term "epoxy equivalency" refers to the number of epoxy groups contained in the average molecule of the desired material. The epoxy equivalency is obtained by dividing the average molecular weight of the polyepoxide by the epoxide equivalent weight. The epoxide equivalent weight is determined by heating one gram sample of the polyepoxide with an excess of pyridinium chloride dissolved in pyridine at the boiling point for 20 minutes. The excess pyridinium chloride is then back titrated with 0.1 N sodium hydroxide to phenolphthalein end point. The epoxide value is calculated by considering one HCl as an equivalent of one epoxide. This method is used to obtain all epoxide values reported herein.

If the polyepoxides are single monomeric compounds having all of their epoxide groups intact, their epoxy equivalency will be whole integers, such as 2, 3, 4, and 5. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5 and the like.

The monomeric-type polyepoxide compounds may be exemplified by the following: vinyl cyclohexane dioxide, epoxidized soyabean oil, butadiene dioxide, 1,4-bis(2,3-epoxypropoxy) benzene, 1,3-bis(2,3-epoxypropoxy) benzene, 4,4'-bis(2,3-epoxypropoxy) diphenyl ether, 1,8-bis(2,3-epoxypropoxy) octane, 1,4-bis(2,3-epoxypropoxy) cyclohexane, 4,4' - bis(2 - hydroxy-3,4-epoxybutoxy) diphenyldimethylmethane, 1,3 - bis(4,5 - epoxypentoxy)-5-chlorobenzene, 1,4-bis(3,4-epoxybutoxy) -2-chlorocyclohexane, diglycidyl ether, 1-3-(2-hydroxy-3,4-epoxybutoxy) benzene, 1,4-bis-(2-hydroxy-4,5-epoxypentoxy) benzene, 1,2,5,6 - di-epoxy-3 - hexyne, 1,2,5,6-diepoxyhexane, and 1,2,3,4-tetra(2-hydroxy-3,4-epoxybutoxy) butane.

Other examples of this type include the glycidyl polyethers of the polyhydric phenols obtained by reacting a polyhydric phenol with a great excess, e. g., 4 to 8 mol excess, of a halogen-containing epoxide in an alkaline medium. Thus 2,2-bis (2,3-epoxypropoxyphenyl) propane is obtained by reacting bis-phenol (2,2-bis(4-hydroxyphenyl) propane) with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl) butane, 4,4'-dihydroxybenzophenone, bis-(4-hydroxyphenyl) ethane, and 1,5-dihydroxynaphthalene. The halogen-containing epoxides may be further exemplified by 3-chloro-1,2-epoxybutane, 3-bromo-1, 3-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis-(2,3-epoxypropyl)-ether, the reaction product of sorbitol and bis-(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis-(2,3-epoxypropyl) ether, and the reaction product of catechol and bis(2,3-epoxy-propyl) ether.

A further group of the polymeric polyepoxides comprises the hydroxy-substituted polyepoxy polyethers obtained by reacting, preferably in an alkaline medium, a slight excess, e. g., .5 to 3 mol excess, of a halogen-containing epoxide as described above, with any of the afore-described polyhydric phenols, such as resorcinol, catechol, bis-phenol, bis(2,2′ - dihydroxy - dinaphthyl) methane, and the like.

Also included within this group are the polyepoxy polyethers obtained by reacting, preferably in the presence of an acid-acting compound, such as hydrofluoric acid, one of the afore-described halogen-containing epoxides with a polyhydric alcohol, such as glycerol, propylene glycol, ethylene glycol, trimethylene glycol, butylene glycol, and the like, and subsequently treating the resulting product with an alkaline component.

Other polymeric polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chloroallyl acetate, and vinyl methallyl pimelate. Illustrative examples of these polymers include poly(allyl 2,3-epoxypropyl ether), poly(2,3-epoxypropyl crotonate), allyl 2,3-epoxypropyl ether-styrene copolymer, methallyl 3,4-epoxybutyl ether-allyl benzoate copolymer, poly (vinyl 2,3-epoxypropyl ether), allyl glycidyl ether-vinyl acetate copolymer and poly(4-glycidyloxystyrene).

Particularly preferred groups of epoxy-containing organic materials to be employed in the process of the invention are the members of the group consisting of the organic compounds possessing a plurality of epoxyalkoxy radicals, e. g., 2 to 4, joined to an organic radical which contains from one to two aromatic rings, organic compounds possessing a plurality of epoxyalkoxy radicals, e. g., 2 to 4, joined to an organic radical containing from one to two aromatic rings, the polyepoxy-containing polymeric reaction product of an aromatic polyhydric phenol and epihalohydrin, the polyepoxy-containing polymeric reaction product of an aliphatic polyhydric alcohol and epichlorohydrin, the polyepoxy containing polymeric reaction product of a polyhydric phenol and a polyepoxide compound, the polyepoxy-containing polymeric reaction product of an aliphatic polyhydric alcohol and a polyepoxide compound, the polymers of the epoxy-containing monomers possessing at least one polymerizable ethylenic linkage prepared in the absence of alkaline or acidic catalysts, and copolymers of the foregoing epoxy-containing monomers and a monomer containing at least one $CH_2=C=$ group prepared in the absence of alkaline or acidic catalysts. The expression "epoxy-alkoxy" radicals refers to an alkoxy radical substituted with an epoxy group. The expression "epoxy-hydroxyalkoxy radical" refers to an alkoxy radical substituted with a hydroxyl and epoxy group.

It will be noted that the adhesive may not only be a polyepoxide, but any suitable adhesive for uniting nylon to the plastic base. For example, it is found that for a polymethyl methacrylate sheet, these adhesives may be used:

(1) Polyepoxide resin
(2) Polymethyl methacrylate dissolved in a suitable solvent
(3) A mixture of polyepoxide resin and polymethyl methacrylate and suitable solvent if necessary
(4) A mixture of polyepoxide resin and methyl methacrylate methacrylic acid copolymer.

Nylon suitable for the application of this invention may be alkoxylated nylon. Preferably "alkoxy" refers to alkoxy groups containing 1 to 4 carbon atoms, so that the preferable alkoxylated nylon is one which has substituted, on the polyamide molecules, any one or a mixture of the following groups: methoxy, ethoxy, propoxy or butoxy. Another nylon which may be employed is a polyamide in which the nitrogen of the amide linkage is bonded to a hydroxyl group. Another type of nylon that may be used is an alkenoxylated nylon. For example, an alkenoxymethyl polyamide can be treated with an unsaturated alcohol and with formaldehyde and a small amount of phosphoric or other oxygen-containing catalyst, and the reaction mixture heated from 100° to 150° C. The oxygen-containing acid catalysts are acids having an ionization constant of at least as great as $9.6 \times 10^{-6}$ and an equivalent conductance, measured at 25° C. in .01 N concentration, no greater than 370 ohms $^{-1}$cm.$^2$ This reaction converts a portion of the carbonamide groups

in the initial polyamide into the groups

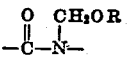

R being any unsaturated alkyl radical. The products of greatest utility are those in which the R group is obtainable from readily available unsaturated alcohols such as allyl, methallyl, crotyl and the like.

The skeletal carbon chain may be composed of two six-carbon constituents, or one five-carbon and one four-carbon constituents, or two five-carbon constituents, or one five-carbon and one six-carbon constituent, or one seven-carbon and one six-carbon constituent and the like. Obviously, the parental polyamide is produced from the combination of a dibasic acid and a diamine. Therefore, the N-alkenoxymethyl polyamides may be N-etheneoxymethyl polyhexamethylene adipamide, N-propeneoxymethyl polyhexamethylene sebacamide, N-buteneoxymethyl polyhexanethylene adipamide, and the like. N-hydroxymethyl polyhexamethylene glutamide, N-methoxymethyl polyhexamethylene adipamide, N-methoxymethyl polyheptamethylene pimelamide, N-ethoxymethyl polytetramethylene adipamide, and the like may be used.

The coating applied to the nylon layer may be a mixture of an epoxy resin mixture and a mixture or a copolymer of an alkyl, cyclo-alkyl, or aromatic acrylate or methacrylate and there may be included an unsaturated acid such as acrylic, methacrylic, maleic, fumaric or crotonic acid. When a solution of one of the above combinations is coated on the surface of the nylon, the coating possesses remarkable mar-resistance and the sheet is easily formable. These characteristics are the properties necessary to allow drawing or forming a sheet of resin into a dome or canopy or other complex curved shape. Depending on the concentration and ingredients of the coating material the sheet may either be formed into a complex or curved shape after curing of the coating has been completed or the coating may be pre-cured, that is, only partially cured prior to forming and the final curing may follow the forming step.

Suitable results may be secured by use of a coating of a polymer of an unsaturated ester of acrylic or alpha-substituted acrylic acid or a polyhydric alcohol polyester of one of these acids or a corresponding amide thereof, such as allyl acrylate, allyl methacrylate, allyl chloracrylate, methallyl acrylate, methallyl methacrylate, methallyl chloracrylate, ethyl allyl methacrylate, crotyl methacrylate, 2-chlorallyl acrylate, 2-chlorallyl methacrylate, propargyl methacrylate, acrylate, or chloracrylate, oleyl methacrylate, vinyl acrylate, vinyl methacrylate, resorcinol dimethacrylate, glycol dimethacrylate, glycol diacrylate, glycerol diacrylate glycerol di- or tri-methacrylate or mixtures thereof, glycol di-alpha-chloracrylate, glycerol di- or tri-alpha-chloracrylate or polyglycol di-acrylate, glycerol di- or tri-acrylate or the acrylic, methacrylic, or alpha-chloracrylic esters of higher polyhydric alcohols, such as sorbitol or mannitol, wherein at least two of the hydroxyl groups are esterified with the above named acids. Additionally, hard solvent-resistant coatings may be secured through use of the corresponding amides of the polymerizable unsaturated acids, such as vinyl, allyl, methallyl, ethylallyl, or oleyl acrylamides, methacrylamides, or chloracrylamides. In addition, other materials containing polymerizable groups

or other polymerizable groups of this type, such as vinyl allyl ether, divinyl ketone, diallyl crotonamide, diallyl methacrylamide, diallyl acrylamide, monoallyl methacrylamide, allyl styrene, or substituted urea derivative, such as diallyl urea, etc. may also be used.

Other products may be secured by polymerization of other organic compounds which contain at least two polymerizable groups preferably those in which one of the groups is the polymerizable group

and is separated by at least one atom whereby the groups are unconjugated. For example, unsaturated aliphatic esters of unsaturated aliphatic acids, such as the unsaturated crotonate esters, allyl crotonate, crotyl crotonate, methallyl crotonate, oleyl crotonate, 2-chlorallyl crotonate, ethylallyl crotonate, or other unsaturated esters such as allyl oleate, allyl itaconate, allyl propiolate, diallyl maleate, allyl ethyl maleate, dimethallyl maleate, ethyl methallyl maleate, methyl allyl maleate, vinyl allyl maleate, divinyl maleate, dipropargyl maleate, fumarate, itaconate, succinate, etc., or other mono or polyester formed by esterification of maleic or fumaric acid or their substituted derivatives, with an unsaturated alcohol or allyl citraconate, allyl fumarate, methallyl fumarate, oleyl fumarate, allyl cinnamate, or the corresponding methallyl, ethylallyl, propargyl, or crotyl esters thereof, or the unsaturated polyesters of saturated polybasic acids and unsaturated monohydric alcohols such as diallyl oxalate, diallyl malonate, di- or tri-allyl citrate, diallyl tartrate, diallyl phthalate, diallyl carbonate, etc., or the corresponding methallyl, propargyl or crotyl esters thereof may be used for this purpose. Similarly, the polyesters of polyhydric alcohols and monobasic unsaturated acids such as ethylene glycol dicrotonate, glycerol di- or tri-crotonate, glycol dicinnamate, glycerol dicinnamate, glycerol dipropiolate, glycol dipropiolate, or the corresponding esters of other glycols such as the propylene glycols, butylene glycols, or polyglycols thereof or the higher alcohols such as sorbitol or mannitol, etc. may be polymerized in this manner. Other organic oxygen compounds which contain at least two polymerizable double bonds and are capable of polymerizing to a final form which is transparent, hard and substantially infusible and insoluble may be used. Thus, unsaturated polyethers of polyhydric alcohols, such as the diallyl, methallyl, oleyl, or crotyl ethers of glycols, such as ethylene, propylene, or butylene glycol or polyglycols such as diethylene glycol, tetraethylene glycol, etc. or the di- or triallyl methallyl, oleyl, or crotyl ethers of glycerol or the corresponding polyesters of the higher polyhydric alcohols, such as mannitol or sorbitol may be applied and polymerized in accordance with our invention.

In addition, esters of inorganic acids such as diallyl sulphate, di- or triallyl phosphate, di- or triallyl borate, di- or triallyl phosphite, allyl silicates, allyl titanates, or similar esters may be polymerized by our process.

The following compositions illustrate the coatings that may be used in this invention, but in no way limit the scope of the invention:

EXAMPLE 1

One part of 5-1 copolymer of cyclohexyl methacrylate and methacrylic acid is dissolved in 3 parts methyl isobutyl ketone and is then added to a solution of 1 part of a polyepoxide resin prepared by reacting dihydric phenol comprising principally bis-phenol with epichlorohydrin in the presence of an alkali.

EXAMPLE 2

Five parts of 1-1 copolymer of methyl methacrylate-crotonic acid is dissolved in methyl isobutyl ketone and is then added to one part of a polyepoxide resin, prepared by reacting dihydric phenol comprising principally bis-phenol with epichlorohydrin in the presence of an alkali.

EXAMPLE 3

A 1-1 copolymer of 2-chloroethyl-alpha-chloroacrylate and alpha-chloroacrylic acid is prepared by refluxing a 20% solution of the two monomers in 1,2,3-trichloropropane containing 1% benzoyl peroxide. One part of this copolymer is mixed with one part of a low molecular weight polyepoxide resin, prepared by reacting bis-phenol and bis(2,3-epoxy-2-methylpropyl) ether.

EXAMPLE 4

A terpolymer of methylmethacrylate (40 parts), methacrylic acid (5 parts) and crotonic acid (5 parts) is prepared by exposing a mixture of the above ingredients to ultra-violet light. Fifty parts of this terpolymer are mixed with fifty parts of a polyepoxide resin prepared by reacting pentaerythritol and 1,2-epoxy-4,5-epoxy pentane.

EXAMPLE 5

A terpolymer of methyl acrylate (40 parts), methacrylic acid (5 parts) and crotonic acid (5 parts) is prepared by exposing a mixture of the above ingredients to ultra-violet light. Fifty parts of this terpolymer, 1 part p-toluene sulfonic acid, 500 parts cyclohexanone and fifty parts of a polyepoxide resin prepared by reacting this phenol with epichlorohydrin and having a molecular weight of about 200, are mixed.

EXAMPLE 6

Methacrylic acid-methyl methacrylate copolymer is prepared by mixing 1 mole of methylmethacrylate monomer, .2 mole methacrylic acid, and .2% benzoyl peroxide (based on total weight) and then refluxing in 2 moles of cyclohexanone for one hour at 137° to 138° C. After cooling, 60 parts of the methyl methacrylate methacrylic acid copolymer is mixed with .2 part para toluene sulfonic acid and 2.5 parts of a polyepoxide resin prepared by reacting bis phenol and epichlorohydrin and having a molecular weight of about 200.

EXAMPLE 7

Nine grams of 1-5 methacrylic acid methyl methacrylate copolymer (prepared as in Example 6) and 3 grams of a polyepoxide resin prepared by reacting bis phenol and epichlorohydrin and having a molecular weight of about 200, are refluxed in 10 grams of cyclohexanone for ½ hour.

It may be seen that the ranges of proportions of the copolymers of the invention are not critical and from 1% to 99% of the acrylic type compound may be used with from 99% to 1% of the polyepoxide resin. It is generally preferable that the copolymer contain from 10% to 40% of the acrylic type compound and from 90% to 60% of the polyepoxide.

Thus it is indicated by the general description of the coating that the coating is a mixture of polyepoxide and a resin formed from at least one monomer having the formula:

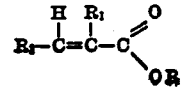

wherein $R_2$ is selected from —H and —$CH_3$, —Cl and —Br, and R is selected from —H and —$C_xH_{2x+1}$, and —$C_xH_{2x-1}$ and halogenated derivatives thereof.

The plastic base is preferably an arcylic base, defined as one or more polymers of acrylic acid or methacrylic acid or crotonic acid or any known ester of either one or acrylonitrile or a copolymer of any of these together.

Thus the composition of the plastic base may comprise one or more polymers of saturated esters or amides of acrylic or alpha-substituted acrylic acids, such as polymerized methyl methacrylate, ethyl methacrylate, methyl methacrylamide, methyl or ethyl acrylate, methyl or ethyl chloroacrylate, or the higher esters of these acids such as the propyl, butyl, isobutyl, phenyl or stearyl esters thereof, or the corresponding monoesters of polyhydric alcohols such as ethylene glycol monomethacrylate, glycerol methacrylate or mixtures of these polymers have been found suitable for base materials. Other thermoplastic polymers which are sufficiently flexible, transparent and stable to light or heat to permit their use in lieu of glass also may be coated or surfaced in accordance with my invention to provide them with hard, durable, solvent-resistant and transparent surfaces. For example, various vinyl polymers, such as polyvinyl acetate, polyvinyl chloride, polyvinyl butyrate, polystyrene, polyvinyl butyral, polyvinyl benzoate, or other fusible or any other thermoplastic polyvinyl halide or ester of a saturated aliphatic or araliphatic acid may be used as base materials. The corresponding allyl or methallyl polymers or other polymers of unsaturated alcohols or esters or ethers thereof such as polyallyl acetate, polyallyl benzoate, polyallyl butyrate, and the like may also be used as a base material. It is understood that the adhesive used for the non-polymethyl methacrylate plastics must be appropriate and suitable for providing adhesion thereto.

As a further modification it is found that flexible resinous plastics of the thermosetting type which are substantially insoluble and/or infusible and are resistant to shattering may be coated or surfaced in accordance with the present invention. Thus, polymers such as may be prepared by the polymerization of polymerizable materials containing in the monomeric form two or more polymerizable groups in which one group may be

and the other may be the same or another polymerizable olefinic double bond or triple bond which are separated by at least one atom so that the double bonds do not form a conjugated system or other polymerizable group may be polymerized in the presence of plasticizers or such materials may be polymerized with other polymerizable materials which are capable of forming linear compounds such as the polymerizable compounds containing the group

and no other polymerizable groups. Thus, alkenyl esters, amides, or nitriles of polymerizable unsaturated acids containing, for example, the polymerizable group

for example, acrylic, methacrylic, chloracrylic, or other alpha-substituted acrylic acid or crotonic acid and an unsaturated alcohol such as allyl methacrylate, chloracrylate, methacrylate, etc. or the corresponding 2-chlorallyl, crotyl, methallyl, ethyl allyl, oleyl, propargyl, furfuryl, etc. esters or other unsaturated compounds containing two or more polymerizable groups such as allyl, methallyl, crotyl, etc., propiolate, or the polyallyl, polymethallyl, polycrotyl, polychlorallyl, polyethyl allyl, etc. esters such as diallyl, dimethallyl, diethylallyl, dicrotyl, di-2-chorallyl, dioleyl, esters of polybasic acids such as oxalic, maleic, fumaric, tartaric, malonic, phthalic, carbonic acids, etc., or the corresponding di- or tri-esters of phosphoric, silicic, titanic, adipic, succinic, or citric acids, or other polyesters of unsaturated alcohols and polybasic acids or monoesters of unsaturated acids, such as mono allyl crotyl maleate, phthalate, malonate, tartrate, etc. may be copolymerized with compounds capable of forming linear polymers. Suitable compounds polymerizing to form the so-called "linear" polymer which may be used for polymerization in accordance with the present invention are vinyl or allyl polymers such as vinyl chloride, styrene, vinyl propionate, vinylidene chloride, vinyl acetate, allyl benzoate, allyl acetate, mono allyl phthalate, allyl methyl phthalate, polymers of methallyl, chlorallyl, crotyl, ethyl, allyl or oleyl alcohol or esters or ethers thereof, or other compounds capable of polymerizing to form a polymer of an unsaturated alcohol or ester, or ether thereof, or a polymer of an unsaturated acid or ester, or amide thereof, such as polmers of saturated esters of acrylic, chloracrylic or methacrylic acid or crotonic acid, for example, methyl, ethyl, propyl, butyl, amyl, lauryl, or stearyl acrylate, methacrylate, chloracrylate, or crotonate. Similar polymers may be secured by polymerizing unsaturated polyesters of polyhydric alcohols such as glycol, glycerol, mannitol, di, tri, or poly acrylate, methacrylate, crotonate, chloracrylate, etc.

In similar manner, polymers of varying hardness may be obtained by polymerizing the above agents in the presence of a quantity, generally from 10 to 70 percent, of a compatible plasticizer, such as dibutyl phthalate, or other phthalates such as ethyl, propyl, isopropyl, butyl, isobutyl, cyclohexyl butyl, phthalates; phosphates, such as tricresyl phosphate, esters of polyhydric alcohols, such as the glycol or glycerol esters, tributyrin, triacetin, glycol benzoate, or substituted amides, such as tetraethyl phthalamide, or other hydrocarbons such as alkyl naphthalene, amyl naphthalene, dixylyl ethane, etc. In this manner it is possible to produce products which possess great flexibility. Similarly, numerous materials such as olelyl methacrylate, oleyl chloracrylate, etc. which may be polymerized alone to form flexible products without plasticizers may be used as base materials.

EXAMPLE 8

Polymethyl methacrylate dissolved in isobutyl ketone is sprayed on one side of a polymethyl methacrylate sheet. After drying for 30 minutes at 80° C., a sheet of N-methoxy polyhexamethylene adipamide is laminated to the precoated side of the polymethyl methacrylate sheet. When the assembly has cooled to room temperature, the coating of Example 2 is applied to the surface of the nylon layer. The assembly is cured at 80° C. for 2 days and at 160° C. for 1 hour after which the mar and abrasion resistance increases.

EXAMPLE 9

Lucite sheets are coated with a composition prepared as follows: 9 grams of 1:5 methacrylic acid methyl methacrylate copolymer and 3 grams of a polyepoxide resin prepared by reacting bis phenol and epichlorohydrin having a molecular weight of about 200, are refluxed in 10 grams of cyclohexanone for ½ hour. The adhesive is air-dried at room temperature for 15 minutes. A sheet of nylon having a tensile strength of about 3,000 at 25° C. and ultimate elongation of about 750% at 25° C. is coated with the adhesive used above. Curing is carried out at 80° C. for 1½ hours followed by a period of 1 hour at 150° C. The laminate shows increased mar, abrasion and scratch resistance.

EXAMPLE 10

Lucite sheets, 6" by 6" are coated with 9:1 methyl methacrylate methacrylic acid copolymer. The sheets are dried for 30 minutes at 80° C. A film of nylon having a tensile strength of about 3,000 at 25° C. and ultimate elongation of about 750% at 25° C. is sprayed on the precoated side of the Lucite. The laminate is dried for 1 hour at 80° C. After the laminate cools down to room temperature, a coating of 60 parts of 9:1 methyl methacrylate methacrylic acid copolymer, .2 parts paratoluene sulfonic acid and 2.5 parts of a polyepoxide resin, prepared by reacting bisphenol with epichlorohydrin and having a molecular weight of about 200, is sprayed upon the nylon. After curing for 30 minutes at 325° F., the laminate is elongated to approximately 18 inches. The sheet shows good abrasion, scratch and craze resistance toward acetone.

EXAMPLE 11

A sheet of polymethyl methacrylate is sprayed with a film of 8:1 methyl methacrylate methacrylic acid copolymer. After the film is air dried, a sheet of polyhexamethylene pimelamide is laminated to the polymethylmethacrylate at 150° C. and a pressure of 5 pounds per square inch for one hour. The laminate is cooled to room temperature and the coating described in Example 5 is sprayed upon the laminate. Curing is effected at 90° C. for 1½ hours and for 1½ hours at 165° C. The resulting cured sheet is more scratch, abrasion and mar-resistant than the uncoated base material.

EXAMPLE 12

A sheet of polymethyl alpha-chloro acrylate is dipped into an adhesive which is a polyepoxide resin prepared by reacting bis-phenol with epichlorohydrin. The coated sheet is allowed to dry in a circulating air oven maintained at about 65° C. for about 1 hour. After cooling to room temperature, the precoated base plastic is laminated to a sheet of hexamethylene sebacamide. After this assembly is cooled to room temperature, the coating of Example 4 is sprayed upon the hexamethylene sebacamide layer. Curing is effected for 6 days at 80° C. and 1 hour at 155° C. The product is more scratch, abrasion and mar-resistant than uncoated base materials.

EXAMPLE 13

The coating of Example 3 is sprayed upon a sheet of polymethyl-alpha-chloroacrylate. The freshly sprayed sheet is dried at 65° C. for 45 minutes. N-ethenoxy polyhexamethylene adipamide is applied to the dried sheet. The assembly is placed between 2 glass plates properly inserted in a neoprene bag which then is evacuated and autoclaved at a pressure of 150 pounds p. s. i. and 130° C. After this assembly is cooled to room temperature, the coating of Example 3 is sprayed upon the nylon layer. Curing is effected for 75° C. for 1½ hours. The product is more scratch, abrasion and mar-resistant than uncoated base materials.

The precuring of the nylon coating comprising polyepoxide and acrylic base may be carried out at 70° C. to 90° C. for 2 to 6 days. Usually a longer curing time increases scratch and abrasion resistance. A subsequent curing time of 1 to 2 hours at 150° C. to 180° C. may be applicable. Catalysts may also be used in order to quicken curing time. In this case paratoluene sulfonic acid, benzoyl peroxide and the like may be used.

It is known that laminating pressures and temperatures may vary with a variety of factors. In most instances, the pressures employed herein were in the range of 150 to 250 pounds per square inch and the temperatures ranged from 120 to 150° C.

The products of this invention yield greatly improved wearing qualities. These tests were applied to the products:

*Scratch test*

The laminates were scratched with a scalpel.

*Abrasion test*

The laminates were abraded with carborundum grains that were dropped from a three-foot height.

*Graze test*

Small areas of the laminate were subjected to solvent applied by a dropper.

*Elongation test*

The products were heated to approximately 165° F. for 20 minutes and stretched to three times the length of the original sample.

*Results*

In all cases the products exhibited greater scratch and abrasion resistance than the untreated plastic or base material.

Since the nylon layer is not attacked by most solvents that attack the untreated plastic base, crazing of the assembly does not occur from these solvents if for any reason they penetrate the outer layer. Nylons are not soluble in most hydrocarbons, chlorinated hydrocarbons or the usual lacquer solvents while most uncross-linked polymers of methyl methacrylate are soluble in acetone, carbon tetrachloride, acetic acid, ethanol, ethyl acetate and the like. However, some nylons are soluble in lower aqueous alcohol and other nylons are soluble in phenols and formic acid. Care should be taken to choose the correct nylon for the desired solvent resistance. In order to increase the severity of the tests, the samples of the products were bent at 10° angles and the solvents applied at the point of stress. Again the samples showed greater craze resistance than the untreated samples.

The products withstood the aforesaid tests much better after elongation than the untreated plastics.

Thus it may be seen that the invention is broad in scope and is not to be limited except by the claims.

Having thus disclosed our invention, we claim:

1. An article of manufacture comprising an acrylic base selected from the group consisting of polymers and copolymers of acrylic acid, methacrylic acid, and esters thereof, said acrylic base coated with a synthetic resin adhesive, said adhesive-coated acrylic base laminated to a preformed layer of resin selected from the group consisting of N-alkoxylated nylons, N-hydroxylated nylons and N-alkenoxylated nylon, said layer of said nylon resin coated with a coating characterized by consisting of a polyepoxide and an acrylic base, said acrylic base selected from the group consisting of the polymers and copolymers of methacrylic acid, acrylic acid and esters thereof.

2. An article of manufacture comprising an acrylic base characterized by consisting of polymethyl methacrylate said acrylic base coated with a synthetic resin adhesive, a preformed layer of an N-alkoxylated nylon laminated to said adhesive-coated acrylic base, said N-alkoxylated nylon coated with a coating characterized by consisting of a polyepoxide and an acrylic base, said acrylic base selected from the group consisting of the polymers and copolymers of methacrylic acid, acrylic acid and esters thereof.

3. An article of manufacture comprising an acrylic base characterized by consisting of polymethyl methacrylate, said acrylic base coated with a synthetic resin adhesive, a preformed layer of an N-alkoxylated nylon laminated to said adhesive-coated acrylic base, said N-alkoxylated nylon coated with a coating characterized by consisting of these constituents: 99%–1% of a polyepoxide, and 1%–99% of an acrylic base selected from the group consisting of polymers and copolymers of methacrylic acid, acrylic acid and polyesters and coesters of aforesaid acids.

4. An article of manufacture comprising an acrylic base characterized by consisting of polymethyl methacrylate, said acrylic base coated with a synthetic resin adhesive, a preformed layer of an N-alkoxylated nylon laminated to said adhesive-coated acrylic base, said N-alkoxylated nylon coated with a coating characterized by consisting of 40% to 10% of a polyepoxide, and 10% to 60% of an acrylic base selected from the group consisting of polymers and copolymers of methacrylic acid, acrylic acid and polyesters and coesters of said acids.

5. An article of manufacture comprising an acrylic base characterized by consisting of polymethyl methacrylate, said acrylic base coated with a synthetic resin adhesive, a preformed layer of an N-alkoxylated nylon laminated to said adhesive coated acrylic base, said N-alkoxylated nylon coated with a coating characterized by comprising these constituents: a polyepoxide and an acrylic base characterized by consisting of methyl methacrylate methacrylic acid copolymers.

References Cited in the file of this patent

UNITED STATES PATENTS

| | | |
|---|---|---|
| 2,320,533 | Muskat et al. | June 1, 1943 |
| 2,346,036 | Leary | Apr. 4, 1944 |
| 2,370,419 | Ray | Feb. 27, 1945 |
| 2,417,837 | Paggi | Mar. 25, 1947 |
| 2,418,018 | Ernsberger et al. | Mar. 25, 1947 |
| 2,456,467 | Swedlow | Dec. 14, 1948 |
| 2,464,826 | Neher et al. | Mar. 22, 1949 |
| 2,598,090 | Yung et al. | May 27, 1952 |